United States Patent
Kotanchery

(10) Patent No.: US 12,081,981 B2
(45) Date of Patent: Sep. 3, 2024

(54) SECURED SEAMLESS AUTHENTICATION FOR BLUETOOTH JUST WORKS PAIRING

(71) Applicant: Harman International Industries, Incorporated, Stamford, CT (US)

(72) Inventor: Jibin Kotanchery, Karnataka (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 345 days.

(21) Appl. No.: 17/663,167

(22) Filed: May 12, 2022

(65) Prior Publication Data

US 2022/0369109 A1    Nov. 17, 2022

(30) Foreign Application Priority Data

May 12, 2021 (IN) .............................. 202141021398
Jul. 22, 2021 (IN) .............................. 202141032940

(51) Int. Cl.
| | |
|---|---|
| H04M 1/66 | (2006.01) |
| H04M 1/68 | (2006.01) |
| H04M 3/16 | (2006.01) |
| H04W 12/041 | (2021.01) |
| H04W 12/069 | (2021.01) |
| H04W 12/50 | (2021.01) |
| H04W 4/80 | (2018.01) |

(52) U.S. Cl.
CPC ....... *H04W 12/069* (2021.01); *H04W 12/041* (2021.01); *H04W 12/50* (2021.01); *H04W 4/80* (2018.02)

(58) Field of Classification Search
CPC . H04W 12/069; H04W 12/041; H04W 12/50; H04W 4/80; H04W 12/043; H04W 12/122; H04W 76/16; H04W 4/48
See application file for complete search history.

(56) References Cited

U.S. PATENT DOCUMENTS

| | | | |
|---|---|---|---|
| 10,538,220 B1 * | 1/2020 | Tyagi .................... | B60R 25/245 |
| 2004/0203354 A1 * | 10/2004 | Yue ....................... | H04W 88/04 |
| | | | 455/517 |
| 2012/0196534 A1 * | 8/2012 | Kasslin ................. | H04W 76/40 |
| | | | 455/41.2 |

(Continued)

*Primary Examiner* — Stephen M D Agosta
(74) *Attorney, Agent, or Firm* — McCoy Russell LLP

(57) ABSTRACT

In a vehicle, an authentication key may be transmitted by a mobile device to an automotive head unit over a first Bluetooth® link (securely-paired), then provided by the automotive head unit to a connectivity extension unit. The authentication key may also be transmitted by the mobile device to the connectivity extension unit over a second Bluetooth® link (not securely-paired). If the authentication key from the automotive head unit matches the authentication key from the mobile device, the connectivity extension unit may perform a transformation on the authentication key to generate a transformed key and transmit it to the mobile device over the second Bluetooth® link. The mobile device may perform the same transformation on its copy of the authentication key, and may compare the resulting transformed key to the transformed key from the connectivity extension unit. If the transformed keys match, the second Bluetooth® link may be verified as secure.

20 Claims, 11 Drawing Sheets

(56) References Cited

U.S. PATENT DOCUMENTS

| | | | | |
|---|---|---|---|---|
| 2014/0240091 A1* | 8/2014 | Talty | ............... | B60R 25/245 |
| | | | | 340/5.62 |
| 2017/0374047 A1* | 12/2017 | Fujiwara | ............ | B60R 25/2018 |
| 2019/0001926 A1* | 1/2019 | Arakawa | ............... | B60R 25/241 |
| 2019/0209100 A1* | 7/2019 | Strahinja | ............... | A61B 5/015 |
| 2019/0370699 A1* | 12/2019 | Chaplow | ............ | H04L 63/0823 |
| 2020/0115931 A1* | 4/2020 | Elbieh | ............... | E05B 85/06 |
| 2020/0287726 A1* | 9/2020 | Garnier | ............... | H04L 67/12 |
| 2020/0322758 A1* | 10/2020 | Kosugi | ............... | G01S 5/14 |
| 2021/0073363 A1* | 3/2021 | Talha | ............... | B60R 25/25 |
| 2021/0345110 A1* | 11/2021 | Revadigar | ............... | B60R 25/24 |
| 2022/0097651 A1* | 3/2022 | Oishi | ............... | G06F 21/32 |
| 2022/0111820 A1* | 4/2022 | Hassani | ............... | H04W 12/06 |
| 2022/0153231 A1* | 5/2022 | Brückner | ............ | H04W 12/069 |
| 2023/0029683 A1* | 2/2023 | Li | ............... | H04W 4/40 |
| 2023/0180010 A1* | 6/2023 | Yang | ............... | H04W 76/10 |
| | | | | 726/6 |
| 2023/0192034 A1* | 6/2023 | Yang | ............... | B60R 25/24 |
| | | | | 340/5.72 |
| 2023/0294635 A1* | 9/2023 | Saito | ............... | B60R 25/01 |
| | | | | 340/5.61 |
| 2023/0327857 A1* | 10/2023 | Li | ............... | H04L 9/0863 |
| | | | | 713/171 |
| 2024/0010165 A1* | 1/2024 | Shi | ............... | G06F 1/3206 |
| 2024/0185658 A1* | 6/2024 | Setterberg | ............ | G07C 9/00857 |

* cited by examiner

SECURED SEAMLESS AUTHENTICATION FOR BLUETOOTH JUST WORKS PAIRING

CROSS-REFERENCE TO RELATED APPLICATIONS

The present application claims priority to Indian Application No. 202141021398, entitled "SECURED SEAMLESS AUTHENTICATION FOR BLUETOOTH JUST WORKS PAIRING," and filed on May 12, 2021, and to Indian Application No. 202141032940, entitled "SECURED SEAMLESS AUTHENTICATION FOR BLUETOOTH JUST WORKS PAIRING," and filed on Jul. 22, 2021. The entirety of the above-listed application is hereby incorporated by reference for all purposes.

FIELD

The disclosure relates to security for automotive computing systems.

BACKGROUND

Currently, Bluetooth® use cases in the vehicular context are often addressed by automotive head units (e.g., car head units), which are frequently positioned in the front a a vehicle's cabin. (Bluetooth® is a registered trademark of Bluetooth® SIG, Inc., Kirkland, WA.) Mobile devices used by occupants of vehicles (such as various phones, smart phones, tablets, laptop computers, and so on) may form Bluetooth® links with the automotive head units. Various premium vehicles may also provide connectivity extension units (e.g., a rear unit, rear seat unit, rear seat module, rear seat entertainment unit, rear seat entertainment module, and/or rear seat entertainment system) along with the automotive head units, and mobile devices used by occupants of vehicles may also form Bluetooth® links with the connectivity extension units.

The Bluetooth® specification (e.g., the Bluetooth Core Specification, versions 4.0, 4.1, 4.2, 5, 5.1, 5.2, and 5.3) provides pairing and bonding features to safeguard user data and avoid eavesdropping by malicious entities. For example, automotive head units frequently include a display or I/O unit. When mobile devices form Bluetooth® links with such automotive head units, part of the pairing process may involve a numerical comparison association method, in which a numerical code is manually provided (via the display or I/O unit) to authenticate that the mobile device is a trusted device that may safely be paired with the automotive head unit.

In contrast, connectivity extension units might not include a display or I/O unit to enable manual provision and/or verification of a numerical code. When mobile devices form Bluetooth® links with such connectivity extension units, they may use a Just Works association model for Bluetooth® pairing, which might not provide authentication of the mobile device. In such cases, it may be possible for an attacking device to connect with the connectivity extension unit without the permission and/or knowledge of the vehicle's owner, then send malicious traffic into the system (e.g., to break into it). As a result, such devices might not provide Man-In-The-Middle (MITM) attack protection during pairing with a phone.

SUMMARY

Disclosed herein are methods, mechanisms, and systems for providing secured and/or seamless authentication (e.g., authentication without manual user intervention) of a Bluetooth® link between a mobile device and a connectivity extension unit lacking a display or I/O unit, where the connectivity extension unit is physically connected to an automotive head unit using a secondary interface, e.g., a wired interface such as a Controller Area Network (CAN) interface, a Universal Serial Bus (USB) interface, or an Ethernet interface. The methods, mechanisms, and systems disclosed herein address possible security issues which can occur in such Bluetooth® devices which don't have a display or I/O unit, and may protect devices from various attacks using malicious packets from an attacker device.

Seamless pairing and authentication between a Bluetooth®-capable connectivity extension unit and a mobile device may be done with the help of an automotive head unit present in the vehicle. In various embodiments, the mobile device may form a secured Bluetooth® connection with the automotive head unit, such as a Bluetooth® Basic Rate/Enhanced Data Rate (BR/EDR) connection, or a Bluetooth® Low Energy (BLE) connection. The mobile device may generate an authentication key (e.g., a unique, secret value), such as by using an application of the mobile device, then transmit the authentication key to the automotive head unit using the secured Bluetooth® connection. The automotive head unit may send this authentication key to a connectivity extension unit through a secondary connection, such as a CAN connection, a USB connection, and/or an Ethernet connection. The authentication key can then be used to authenticate Just Works Bluetooth® pairing between the connectivity extension unit and the mobile device. Such Bluetooth® seamless authentication may be achieved using authentication via both Bluetooth® BR/EDR Just Works pairing and BLE Just Works pairing.

The methods, mechanisms, and systems disclosed herein may accordingly provide secured authentication between a connectivity extension unit and a mobile device in a vehicular context, over Bluetooth® links that might otherwise be unsecured. This may protect the device from various attacks using malicious packets from an attacker device.

In some embodiments, the issues described above may be addressed by providing for an authentication key to be transmitted from a mobile device to an automotive head unit a securely-paired link (which may be a Bluetooth® based link), and provided by the automotive head unit to a connectivity extension unit over a vehicular communication link. The authentication key may also be transmitted from the mobile device to the connectivity extension unit over a non-securely-paired link (which may be either a Bluetooth® BR/EDR based link or a BLE based link). If the authentication key as provided by the automotive head unit matches the authentication key as transmitted by the mobile device, the connectivity extension unit may perform a predetermined transformation of the authentication key to generate a first transformed key (for example, by incrementing the authentication key by one, or by performing another mathematical or formulaic operation on the authentication key), and the transformed key may be transmitted from the connectivity extension unit to the mobile device over the non-securely-paired link. The mobile device may then perform the same predetermined transformation of the authentication key to generate a second transformed key, and if the mobile device determines that the first transformed key matches the second transformed key, a security of the non-securely-paired wireless communication link may be authenticated. In this way, security of a non-securely-paired link may be authenticated in a vehicular context.

For some embodiments, the issues described above may be addressed by providing for both a pairing between a mobile device and an automotive head unit over a first link (which may be a securely-paired Bluetooth® based link), a connection between the automotive head unit and a connectivity extension device over a second link (which may be a vehicular communication link), and a pairing between the mobile device and a connectivity extension unit of the vehicle over a third link (which may be either a non-securely-paired Bluetooth® BR/EDR based link or a non-securely-paired BLE based link). A first key (e.g., a unique, secret value) may be transmitted from the mobile device to the automotive head unit over the first link, and the first key may be provided by the automotive head unit to the connectivity extension unit over the second link. The first key may also be transmitted from the mobile device to the connectivity extension unit over the third link. At the connectivity extension unit, if the first key as received from the automotive head unit matches the first key as received from the mobile device, a predetermined transformation may be performed on the first key to generate a second key, which may be transmitted through the third link to the mobile device. At the mobile device, the predetermined transformation may also be performed independently on the first key to generate a third key, and a security of the third link may be verified based on a comparison of the second key to the third key. In this way, a security of a non-securely-paired wireless communication link in a vehicle may be verified.

In further embodiments, the issues described above may be addressed by pairing a mobile device and an automotive head unit of the vehicle over a first link (which may be a securely-paired BLE based link). An authentication key (e.g., a unique, secret value) may be generated at the automotive head unit, and a confirmation key (e.g., a unique, secret value) may be generated at the mobile device. The authentication key and the confirmation key may be mutually exchanged between the automotive head unit and the mobile device. The authentication key and the confirmation key may be provided by the automotive head unit to a connectivity extension unit over a vehicular communication link, and the authentication key may also be transmitted from the mobile device to the connectivity extension unit over a second link (which may be either a non-securely-paired Bluetooth® BR/EDR based link or a non-securely-paired BLE based link). At the connectivity extension unit, if the authentication key as received from the automotive head unit matches the authentication key as received from the mobile device, the confirmation key may be transmitted from the connectivity extension unit to the mobile device. At the mobile device, if the confirmation key as received from the automotive head unit matches the confirmation key as received from the connectivity extension unit, the second link may be verified as being secure. The mobile device and the connectivity extension unit may be paired over the second link.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
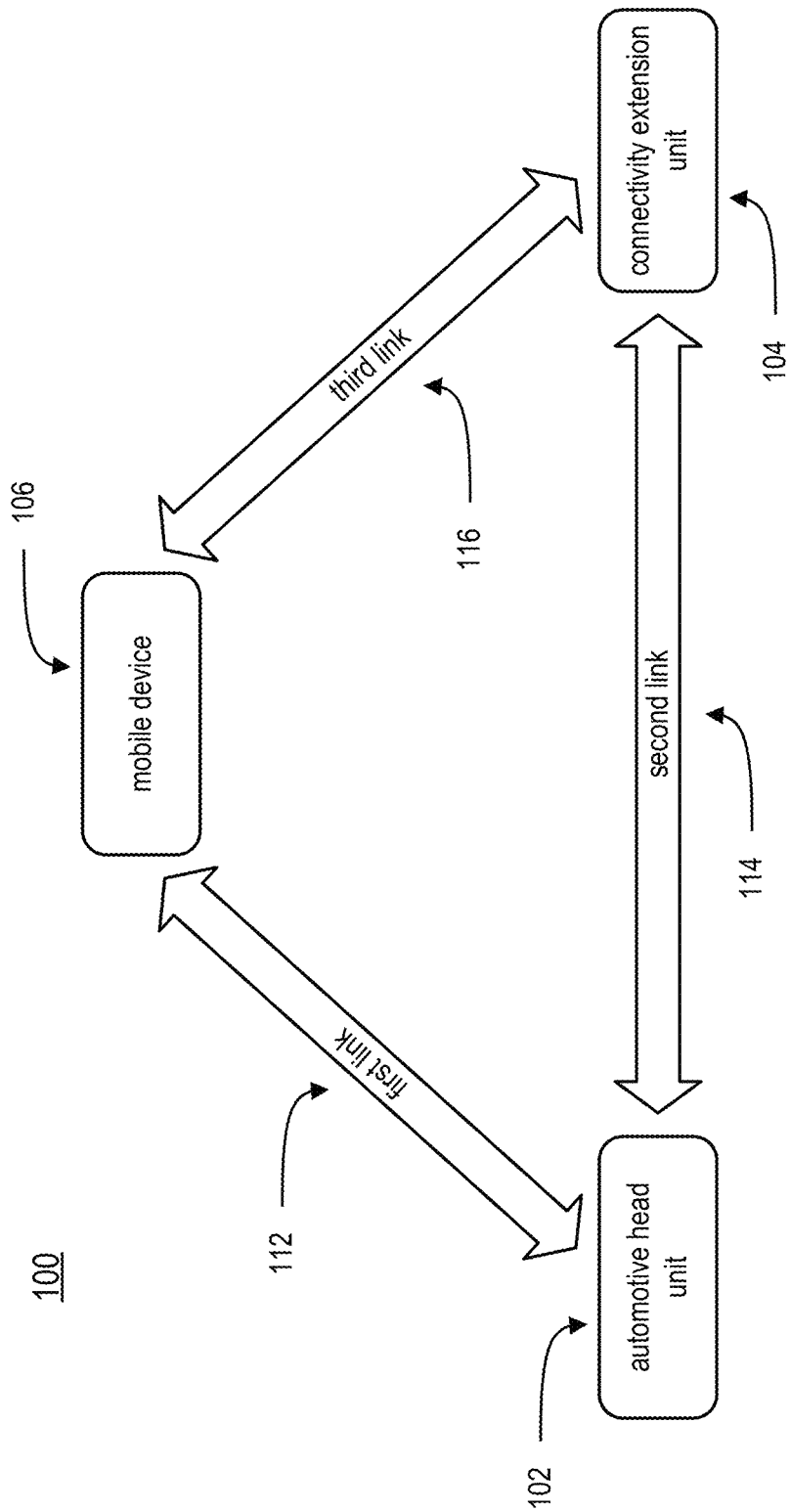
FIG. 1 shows a system for authenticating non-securely-paired Bluetooth® based wireless links between a mobile device and a vehicular connectivity extension unit, in accordance with one or more embodiments of the present disclosure.
Figure 2:
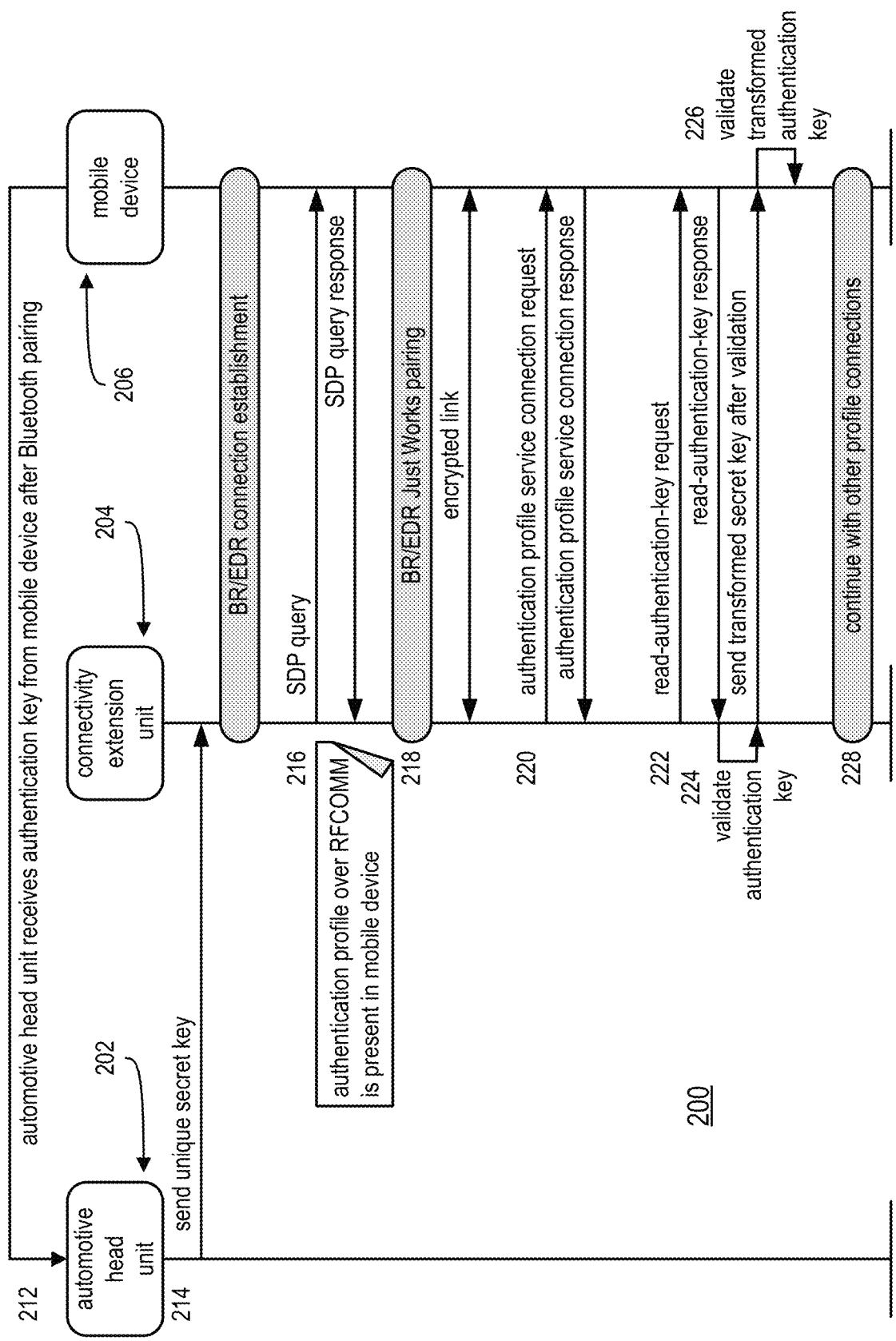
FIG. 2 shows a protocol diagram for authentication of a non-securely-paired Bluetooth® Basic Rate/Enhanced Data Rate (BR/EDR) based link between a mobile device and a vehicular connectivity extension unit, in accordance with one or more embodiments of the present disclosure.
Figure 3:
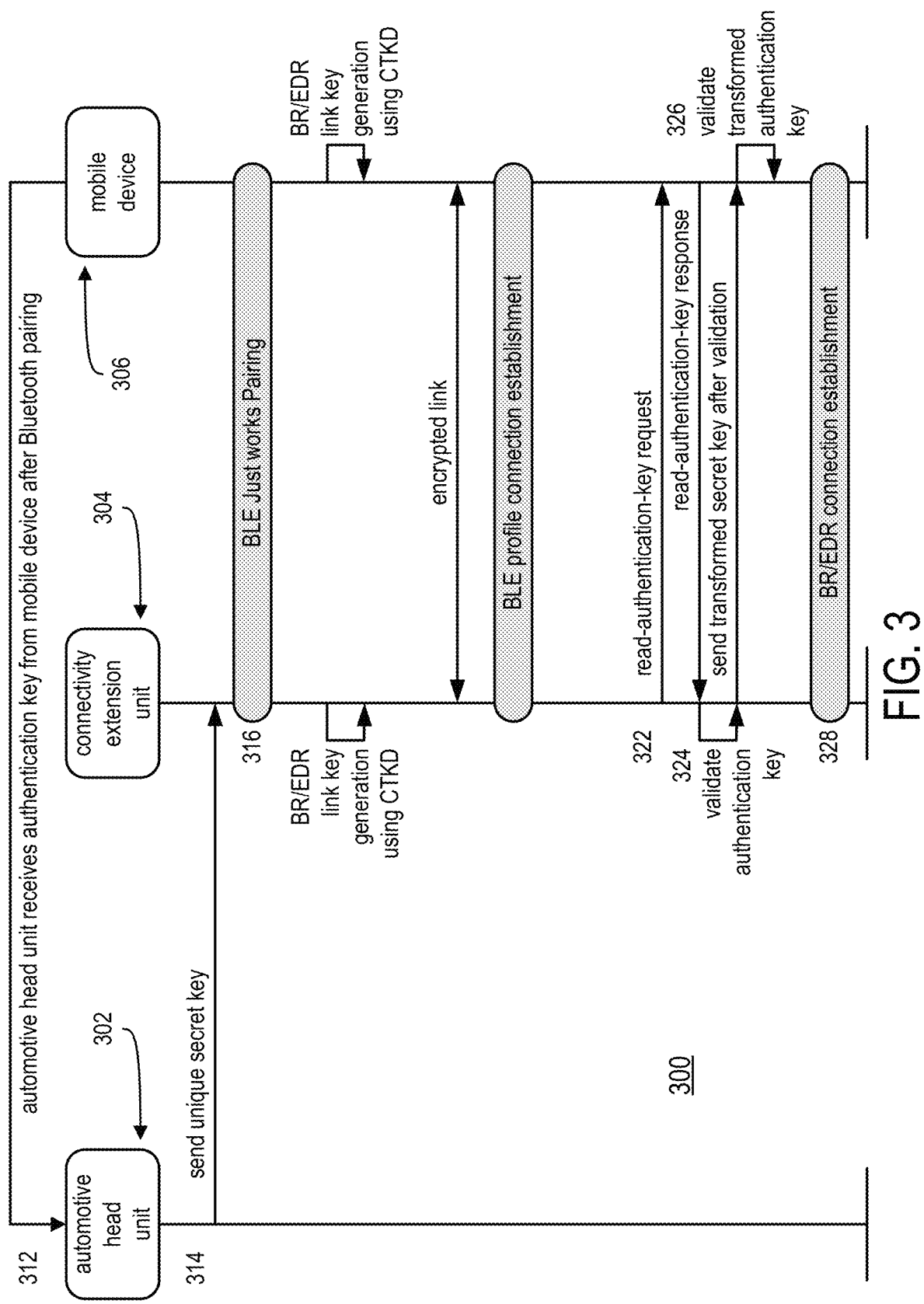
FIG. 3 shows a protocol diagram for authentication of a non-securely-paired Bluetooth® Low Energy (BLE) based link between a mobile device and a vehicular connectivity extension unit, in accordance with one or more embodiments of the present disclosure.
Figure 4:
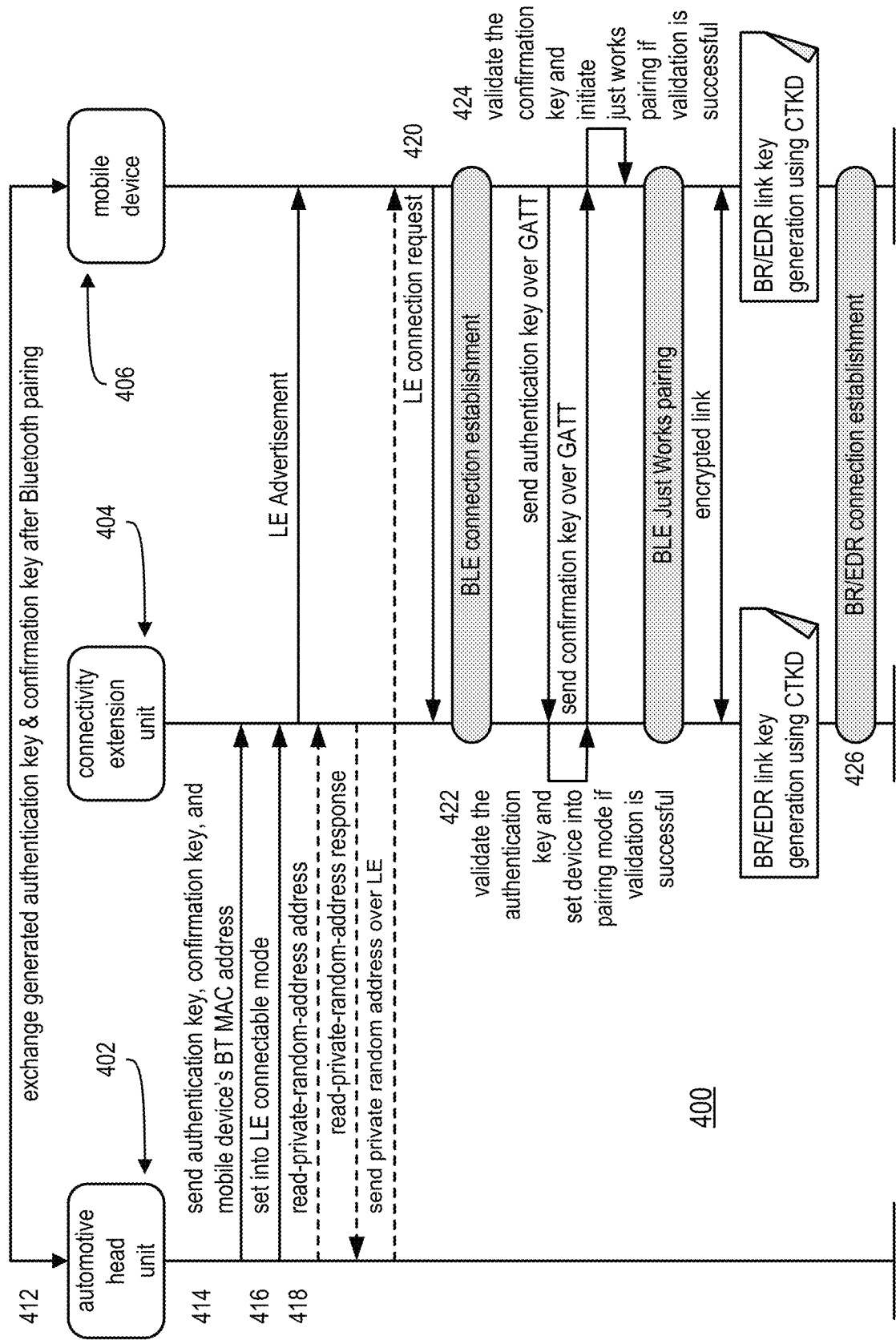
FIG. 4 shows a further protocol diagram for authentication of a non-securely-paired Bluetooth® Low Energy (BLE) based link between a mobile device and a vehicular connectivity extension unit, in accordance with one or more embodiments of the present disclosure.
Figure 5A:
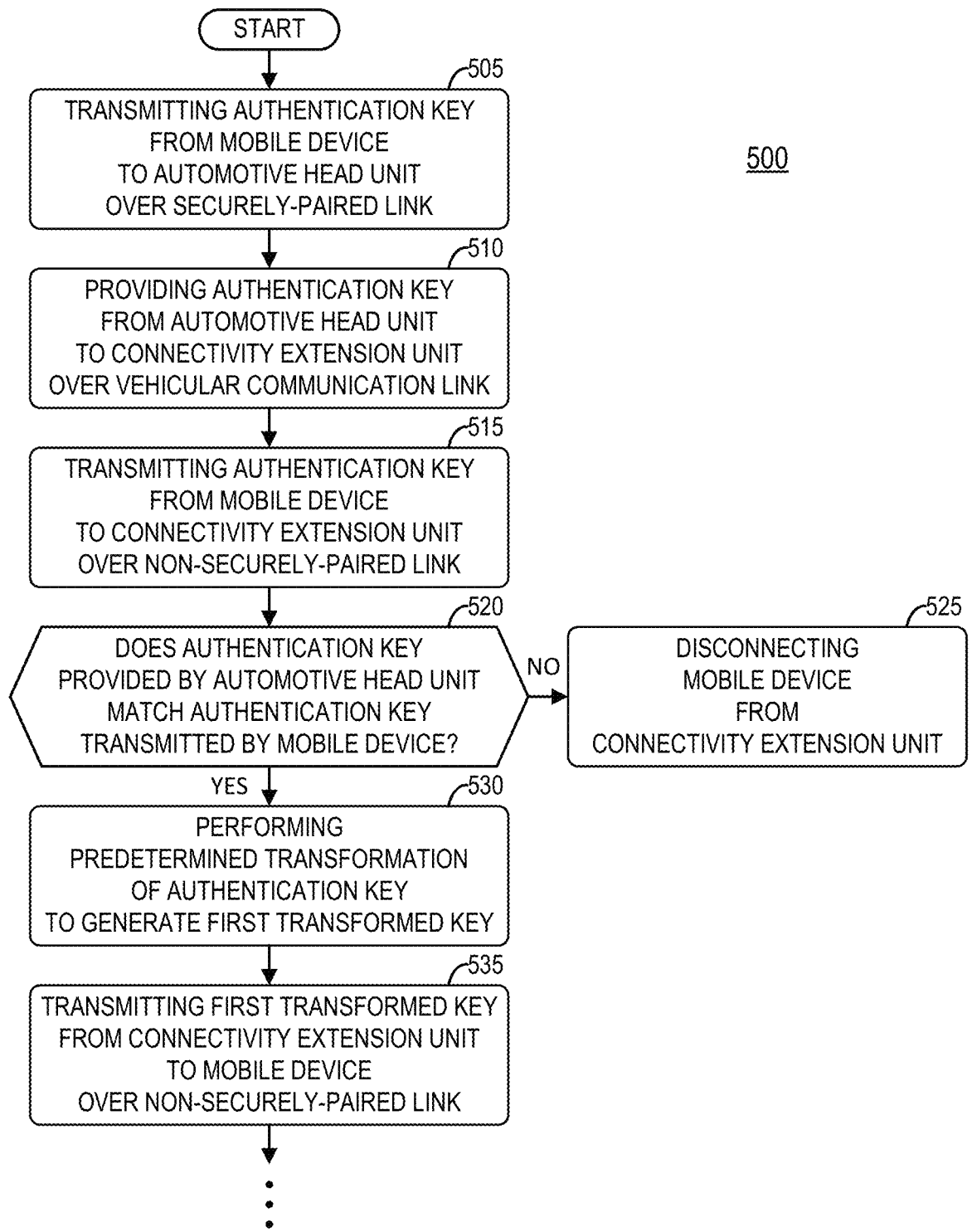
FIGS. 5A and 5B show a method of for providing secured and/or seamless authentication (e.g., authentication without manual user intervention) of a Bluetooth® link between a mobile device and a connectivity extension unit lacking a display or I/O unit, in accordance with one or more embodiments of the present disclosure.
Figure 5B:
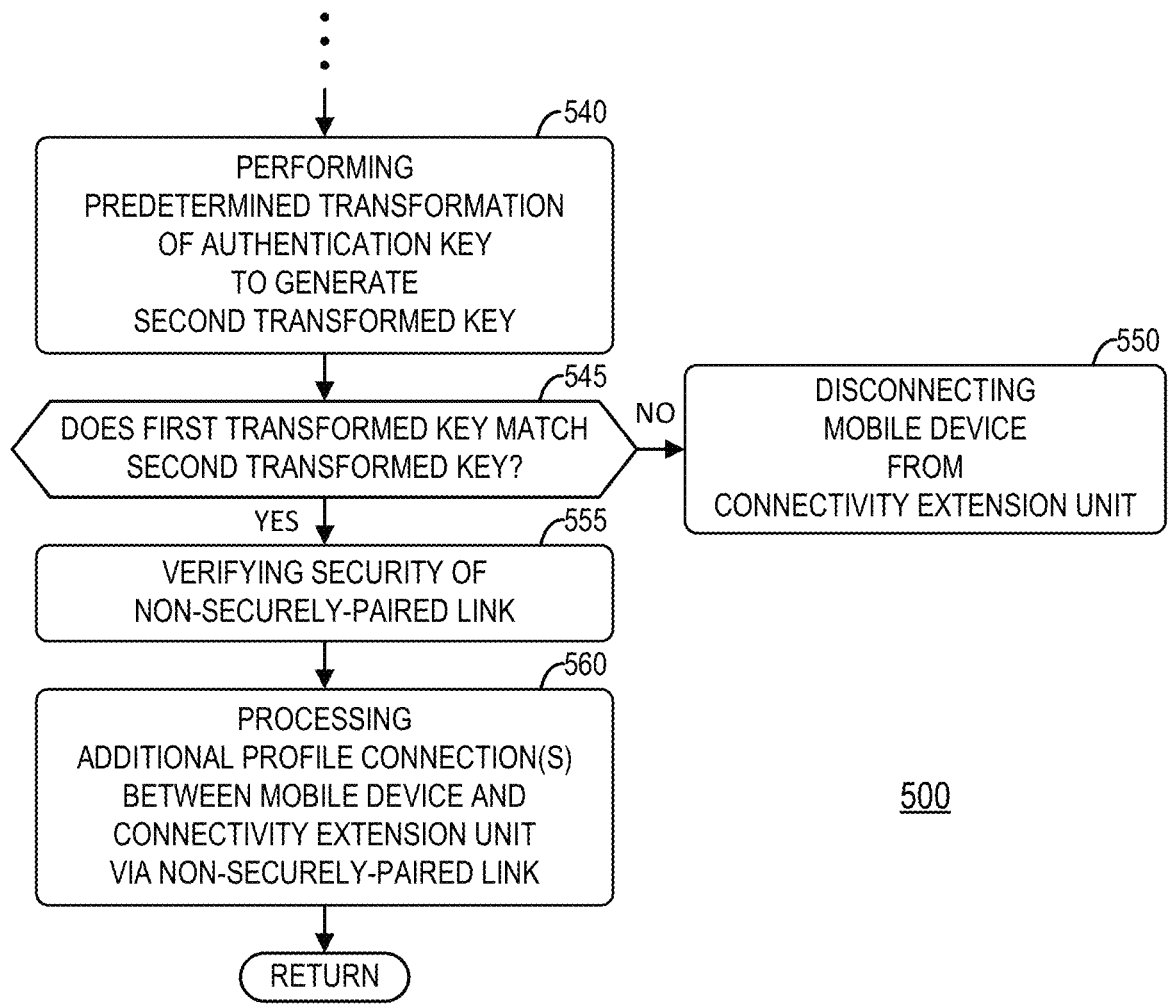
Figure 6A:
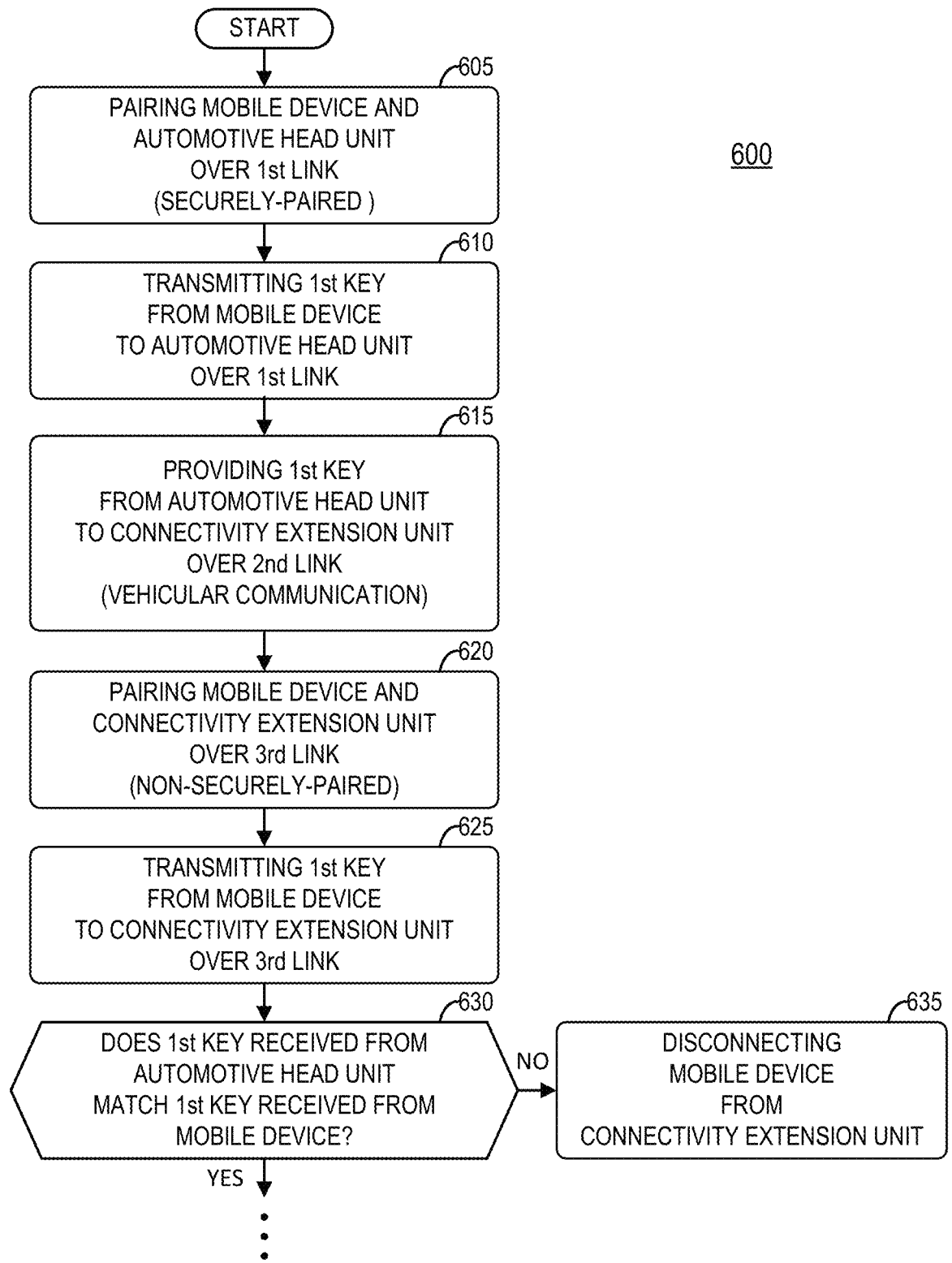
FIGS. 6A and 6B show a method of verifying security of a non-securely-paired wireless communication link in a vehicle, in accordance with one or more embodiments of the present disclosure.
Figure 6B:
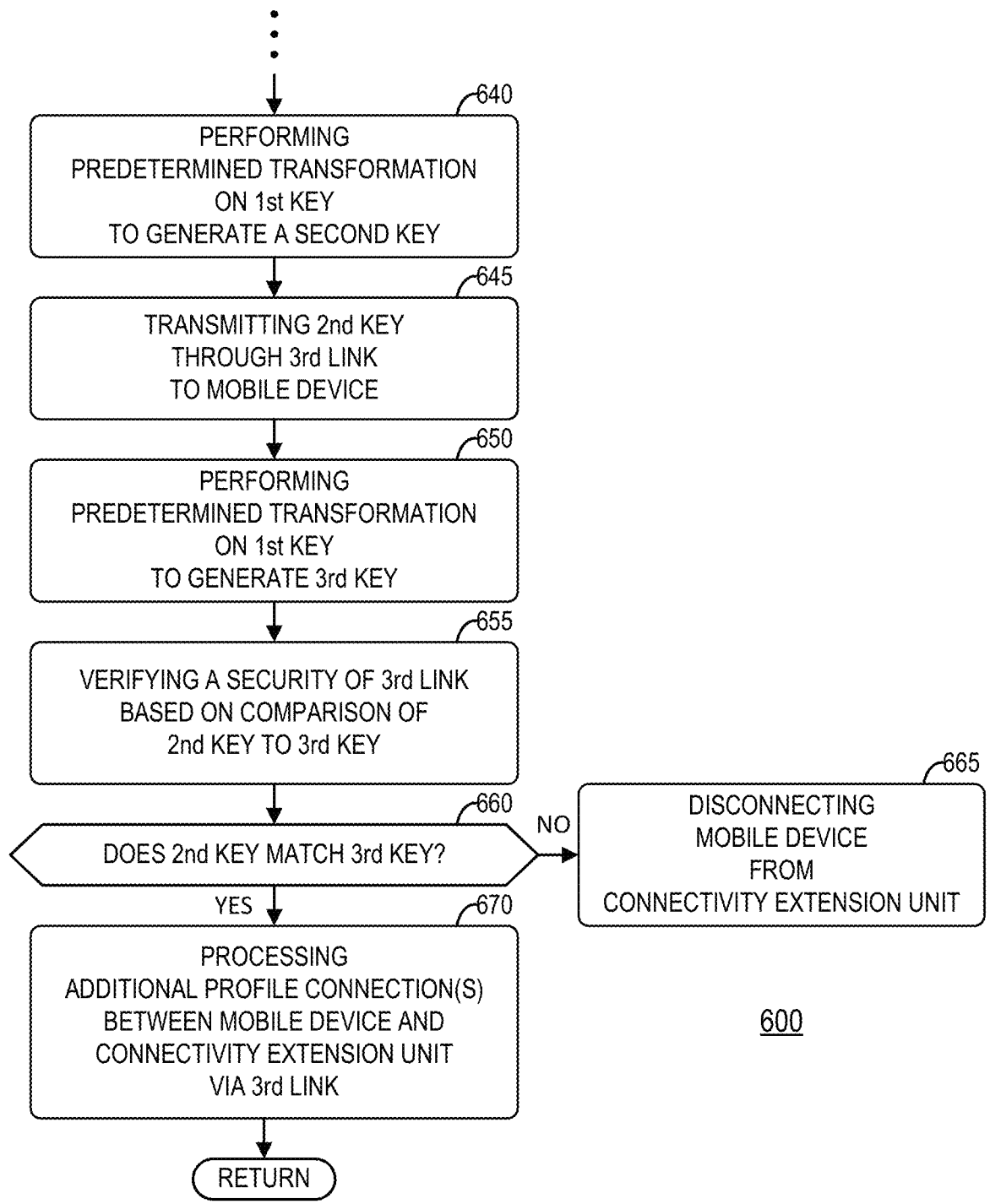
Figure 7A:
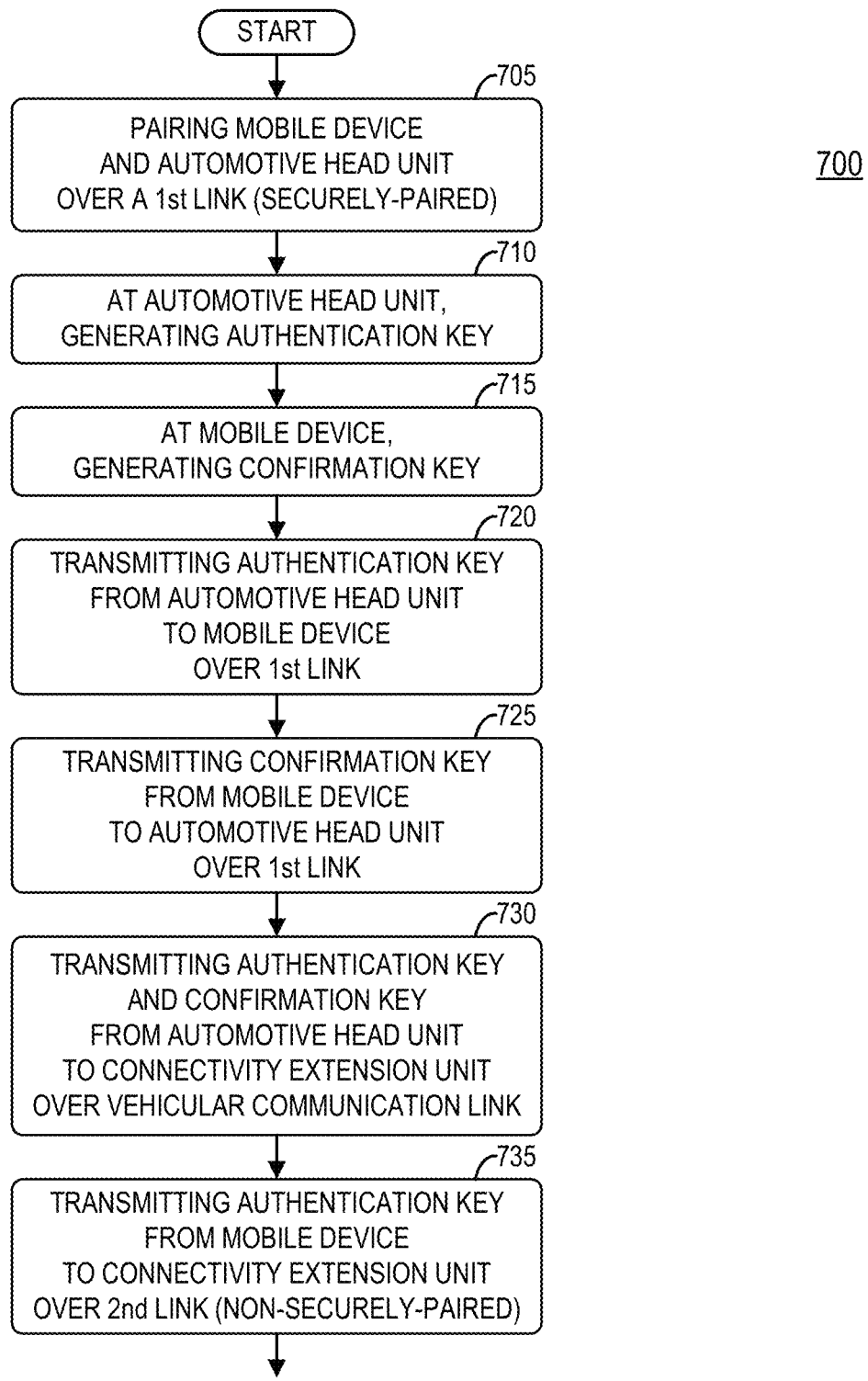
FIGS. 7A and 7B show a method of securing a non-securely-paired Bluetooth® Low Energy link in a vehicle, in accordance with one or more embodiments of the present disclosure.
Figure 7B:
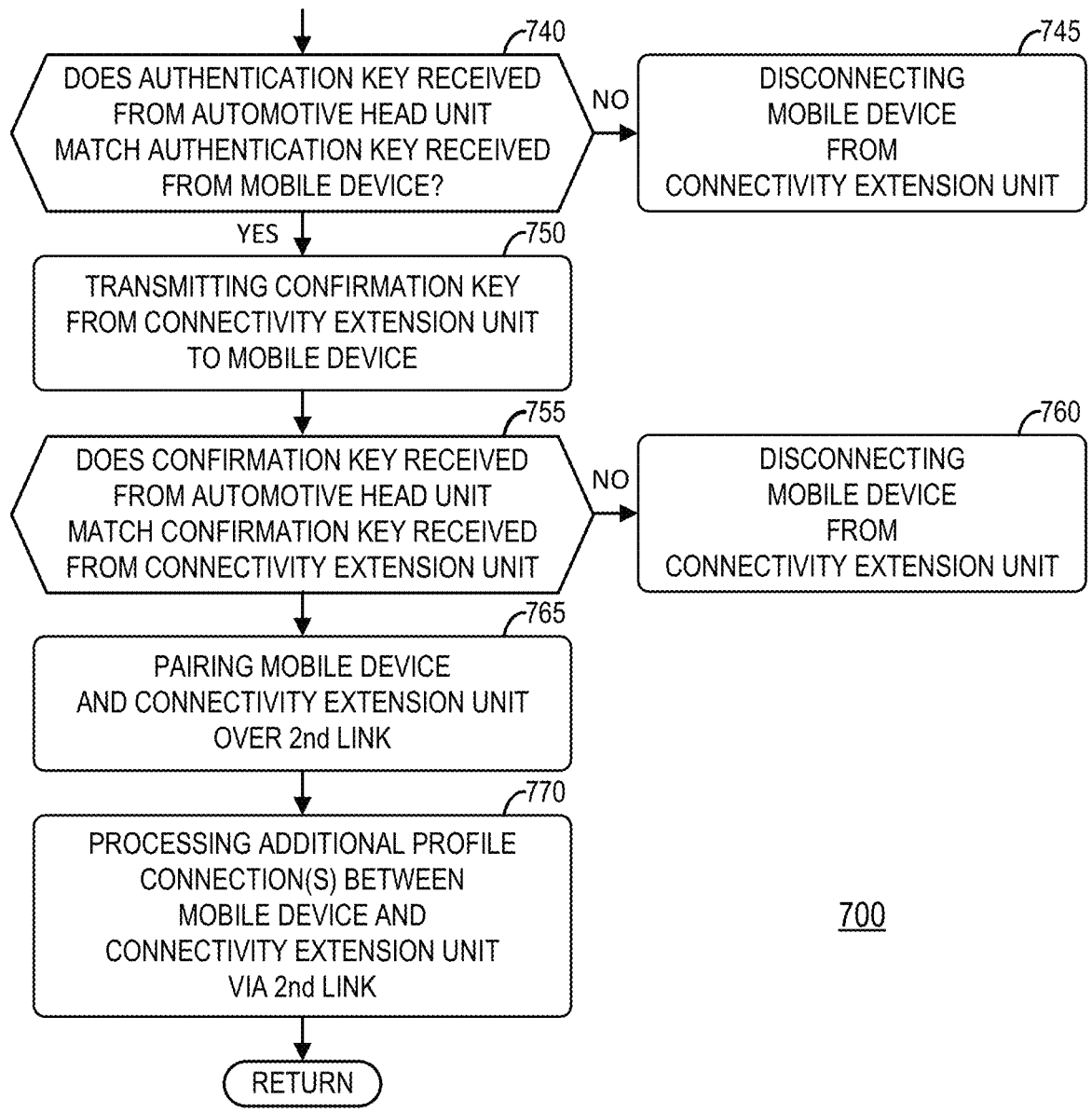

Disclosed herein are various methods, systems, and mechanisms for securing non-securely-paired Bluetooth® links in a vehicular context. FIG. 1 shows major parts of a system for securing the non-securely-paired Bluetooth® links. FIG. 2 shows a protocol diagram for authentication of non-securely-paired Bluetooth® BR/EDR based links, and FIG. 3 shows a protocol diagram for authentication of non-securely-paired BLE based links. FIG. 4 shows a further protocol diagram for authentication of non-securely-paired BLE based links. FIGS. 5A and 5B, as well as FIGS. 6A and 6B, show methods applicable to securing both non-securely-paired Bluetooth® BR/EDR based links and non-securely-paired BLE based links (e.g., pertinent to both FIGS. 2 and 3). Finally, FIGS. 7A and 7B show methods applicable to securing non-securely-paired BLE based links (e.g., pertinent to FIG. 4). Using the methods, systems, and mechanisms disclosed herein, connectivity extension units in vehicles may form secure Bluetooth® links with nearby mobile devices.

FIG. 1 shows a system 100 for authenticating non-securely-paired Bluetooth® based wireless links between mobile devices and vehicular connectivity extension units. As shown in FIG. 1, a mobile device 106 may be paired and connected to an automotive head unit 102 present in a vehicle (e.g., using a numerical comparison association method as discussed herein) over a first link 112, which may be a securely-paired Bluetooth® link, such as a Bluetooth® Basic Rate/Enhanced Data Rate (BR/EDR) based connection, or a Bluetooth® Low Energy (BLE) based connection. Automotive head unit 102 may be connected to a connectivity extension unit 104 that is also present in the vehicle over a second link 114, which may be a vehicular communication link (such as a CAN connection, a USB connection, and/or an Ethernet connection). Automotive head unit 102 may then assist in a seamless pairing and authentication between mobile device 106 and connectivity extension unit 104 over a third link 116, which may be a non-securely-paired Bluetooth® link.

In various embodiments, an authentication key (e.g., a unique, secret value) may be generated, such as by using an application in mobile device 106. Mobile device may send the authentication key over first link 112 to automotive head unit 102, and automotive head unit 102 may send the authentication key over second link 114 to connectivity extension unit 104. As discussed further herein, the authentication key can be used to authenticate Just Works pairing between connectivity extension unit 104 and mobile device 106. Seamless Bluetooth® authentication achieved in such a manner may include authentication via Bluetooth® BR/EDR Just Works pairing, and authentication via Bluetooth® Low Energy Just Works pairing.

FIG. 2 shows a diagram of a protocol 200 for authentication of a non-securely-paired Bluetooth® Basic Rate/Enhanced Data Rate (BR/EDR) based link between a mobile device and a vehicular connectivity extension unit (e.g., a Bluetooth® link formed using Just Works pairing). Protocol 200 occurs between an automotive head unit 202, a mobile device 206, and a connectivity extension unit 204 (which may be substantially similar to automotive head unit 102, mobile device 106, and connectivity extension unit 104, respectively).

Automotive head unit 202 may first pair with mobile device 206 over a secured Bluetooth® based connection, such as either a Bluetooth® BR/EDR based connection or a BLE based connection (which has been secured using, e.g., a numerical comparison association method). Mobile device 206, and/or an application of mobile device 206, may generate an authentication key (e.g., a unique, secret value) and send it to automotive head unit 202 over the secured Bluetooth® connection. Automotive head unit 202 may send the authentication key to connectivity extension unit 204 through a secondary vehicular-communication connection (e.g., a wired connection such as a CAN connection, a USB connection, or an Ethernet connection). Connectivity extension unit 204 may use this authentication key for authentication of a non-secured Bluetooth® BR/EDR connection with mobile device 206 after Just Works pairing. In various embodiments, a Bluetooth® profile for authentication purposes (e.g., a proprietary profile) may be implemented on top of the Bluetooth® radio frequency communication (RF-COMM) protocol with a dedicated Universally Unique Identifier (UUID) in automotive head unit 202 and/or mobile device 206 (e.g., a proprietary UUID).

In various embodiments, protocol 200 may have a variety of parts. At a part 212, automotive head unit 202 may pair with mobile device 206 over a secured Bluetooth® connection, and mobile device 206 may generate an authentication key and transmit the authentication key to automotive head unit 202 over the secured Bluetooth® connection.

At a part 214, automotive head unit 202 may provide the authentication key to connectivity extension unit 204 through a vehicular communication link, such as a CAN link, a USB link, or an Ethernet link. In various embodiments, automotive head unit 202 may provide a Bluetooth® address of mobile device 206 through the vehicular communication link as well as the authentication key.

At a part 216, connectivity extension unit 204 may then send an SDP query to mobile device 206 to determine the availability of a Bluetooth® authentication profile on mobile device 206 (e.g., for BR/EDR connection establishment between connectivity extension unit 204 and mobile device 206). Connectivity extension unit 204 may then receive an SDP query response from mobile device 206.

At a part 218, if the authentication profile UUID is available in mobile device 206 (e.g., if the authentication profile over Bluetooth® RFCOMM is present in mobile device 206), then connectivity extension unit 204 may pair with mobile device 206 over a Bluetooth® BR/EDR connection using a non-secured pairing method, e.g., a Just Works pairing method.

After pairing (e.g., immediately after pairing), at a part 220, connectivity extension unit 204 may establish an authentication profile connection with mobile device 206 (e.g., a proprietary profile connection), such as by sending a profile service connection request to mobile device 206 and receiving a profile service connection response from mobile device 206.

At a part 222, connectivity extension unit 204 may fetch the authentication key from mobile device 206 through the Bluetooth® link (which may be an encrypted link), such as by sending a read-authentication-key request to mobile device 206 and receiving a read-authentication-key response from mobile device 206.

At a part 224, connectivity extension unit 204 may compare the authentication key it receives from mobile device 206 to the authentication key it had already received from automotive head unit 202, in order to verify whether the authentication keys as received from the two different sources match. If the authentication keys match, then connectivity extension unit 204 may perform a predetermined transformation on the authentication key (e.g., a mathematical or formulaic transformation, such as an increment-by-one operation) to generate a transformed authentication key, which connectivity extension unit 204 may then send back to mobile device 206.

At a part 226, an application of mobile device 206 may independently perform the same predetermined transformation on its own copy of the authentication key, and may compare the resulting transformed authentication key to the transformed authentication key it receives from connectivity extension unit 204.

If the authentication keys match when compared by connectivity extension unit 204, and if the transformed authentication keys match when compared by mobile device 206, then at a part 228, connectivity extension unit 204 and mobile device 206 may proceed with one or more other Bluetooth® profile connections, such as a Bluetooth® Hands-Free Profile (HFP) connection, a Bluetooth® Advanced Audio Distribution Profile (A2DP) connection, and so on. Since both devices will have been authenticated by exchanging and verifying the authentication key (and the transformed authentication key generated based on the authentication key), the connection between them may be considered trusted.

If the authentication keys do not match when compared by connectivity extension unit 204, or if the transformed authentication keys do not match when compared by mobile device 206, then connectivity extension unit 204 and/or mobile device 206 may disconnect and/or delete the pairing.

FIG. 3 shows a diagram of a protocol 300 for authentication of a non-securely-paired Bluetooth® Low Energy (BLE) based link between a mobile device and a vehicular connectivity extension unit (e.g., a Bluetooth® link formed using Just Works pairing). Protocol 300 occurs between an automotive head unit 302, a mobile device 306, and a connectivity extension unit 304 (which may be substantially similar to automotive head unit 102, mobile device 106, and connectivity extension unit 104, respectively).

Automotive head unit 302 may first pair with mobile device 306 over a secured Bluetooth® based connection, such as either a Bluetooth® BR/EDR based connection or a BLE based connection (which has been secured using, e.g., a numerical comparison association method). Mobile device 306, and/or an application of mobile device 306, may generate an authentication key and send it to automotive head unit 302 over the secured Bluetooth® connection. Automotive head unit 302 may send the authentication key to connectivity extension unit 304 through a secondary vehicular-communication connection (e.g., a wired connection such as a CAN connection, a USB connection, or an Ethernet connection). Connectivity extension unit 304 may use this authentication key for authentication of a non-secured BLE connection with mobile device 306 after Just Works pairing. In various embodiments, a BLE profile may be implemented in connectivity extension unit 304 and/or mobile device 306, such as on top of a Bluetooth® Generic Attribute Profile (GATT), which may support the exchange and validation of authentication keys.

In various embodiments, protocol 300 may have a variety of parts. At a part 312, automotive head unit 302 may pair with mobile device 306 over a secured Bluetooth® connection, and mobile device 306 may generate an authentication key and transmit the authentication key to automotive head unit 302 over the secured Bluetooth® connection.

At a part 314, automotive head unit 302 may provide the authentication key to connectivity extension unit 304 through a vehicular communication link, such as a CAN link, a USB link, or an Ethernet link. In various embodiments, automotive head unit 302 may provide a Bluetooth® address of mobile device 306 through the vehicular communication link as well as the authentication key.

At a part 316, connectivity extension unit 304 may pair with mobile device 306 over a BLE connection using a non-secured pairing method, e.g., a Just Works pairing method, and may generate a BR/EDR link key using a cross transport key derivation method. Various embodiments may employ a BLE advertisement process, in which an authentication profile UUID may be present (which may be offered by connectivity extension unit 304 and/or mobile device 306).

After pairing (e.g., immediately after pairing), at a part 322, connectivity extension unit 304 may fetch the authentication key from mobile device 306 via BLE profile communication through the Bluetooth® link (which may be an encrypted link), such as by sending a read-authentication-key request to mobile device 306 and receiving a read-authentication-key response from mobile device 306.

At a part 324, connectivity extension unit 304 may compare the authentication key it receives from mobile device 306 to the authentication key it had already received from automotive head unit 302, in order to verify whether the authentication keys as received from the two different sources match. If the authentication keys match, then connectivity extension unit 304 may perform a predetermined transformation on the authentication key (e.g., a mathematical or formulaic transformation, such as an increment-by-one operation) to generate a transformed authentication key, which connectivity extension unit 304 may then send back to mobile device 306.

At a part 326, an application of mobile device 306 may independently perform the same predetermined transformation on its own copy of the authentication key, and may compare the resulting transformed authentication key to the transformed authentication key it receives from connectivity extension unit 304.

If the authentication keys match when compared by connectivity extension unit 304, and if the transformed authentication keys match when compared by mobile device 306, then at a part 328, connectivity extension unit 204 and/or mobile device 206 may proceed with Bluetooth® connections (e.g., BLE connections) for one or more other profiles, such as a Bluetooth® HFP connection, a Bluetooth® A2DP connection, and so on. Since both devices will have been authenticated by exchanging and verifying the authentication key (and the transformed authentication key generated based on the authentication key), the connection between them may be considered trusted.

If the authentication keys do not match when compared by connectivity extension unit 304, or if the transformed authentication keys do not match when compared by mobile device 306, then connectivity extension unit 304 and/or mobile device 306 may disconnect and/or delete the pairing.

FIG. 4 shows a diagram of a protocol 400 for authentication of a non-securely-paired Bluetooth® Low Energy (BLE) based link between a mobile device and a vehicular connectivity extension unit (e.g., a Bluetooth® link formed using Just Works pairing). Protocol 400 occurs between an automotive head unit 402, a mobile device 406, and a connectivity extension unit 404 (which may be substantially similar to automotive head unit 102, mobile device 106, and connectivity extension unit 104, respectively).

Automotive head unit 402 may first pair with mobile device 406 over a secured Bluetooth® based connection, such as either a Bluetooth® BR/EDR based connection or a BLE based connection (which has been secured using, e.g., a numerical comparison association method). Automotive head unit 402 (and/or an application of automotive head unit 402) may generate an authentication key and send it to mobile device 406 over the secured Bluetooth® connection; similarly, mobile device 406 (and/or an application of mobile device 206) may generate an authentication key and send it to automotive head unit 402 over the secured Bluetooth® connection. The authentication key and the confirmation key may each be a unique, secret value. For this key exchange, automotive head unit 402 and/or mobile device 406 may implement an authentication BLE service and/or profile, e.g., on top of a Bluetooth® GATT.

Automotive head unit 402 may send the authentication key and the confirmation key to connectivity extension unit 404 through a secondary vehicular-communications connection, such as a CAN connection, a USB connection, and/or an Ethernet connection. Connectivity extension unit 404 may use the authentication key with mobile device 406 and send the confirmation key to mobile device 406 over the non-securely-paired Bluetooth® connection (e.g., the Bluetooth® Low Energy connection) before Just Works pairing.

Connectivity extension unit 404 and mobile device 406 may implement a proprietary Bluetooth® Low Energy service and/or a profile on top of GATT, which may facilitate or perform the exchange and validation of the authentication key and the confirmation key.

The generated confirmation key and/or authentication key \may be for one-time use, and new keys may be generated and exchanged before each pairing attempt.

In various embodiments, protocol 400 may have a variety of parts. At a part 412, automotive head unit 402 may pair with mobile device 406 over a secured BLE connection. Automotive head unit 402 may generate an authentication key and transmit the authentication key to mobile device 406 over the secured BLE connection; similarly, mobile device 406 may generate a confirmation key and transmit the confirmation key to automotive head unit 402 over the secured BLE connection. In various embodiments, this key exchange may be done through an authentication BLE service and/or profile implemented over GATT.

At a part 414, automotive head unit 402 may pass the authentication key and the confirmation key to connectivity extension unit 404 through a secondary, vehicular-communication link, such as a CAN link, a USB link, or an Ethernet link. In various embodiments, automotive head unit 402 may provide a Bluetooth® address of mobile device 406 (e.g., a Bluetooth® media access control (MAC) address) through the vehicular communication link as well as the authentication key and confirmation key.

At a part 416, automotive head unit 402 may set connectivity extension unit 404 in a connectable mode by sending a message through the vehicular communication link. Connectivity extension unit 404 may then start BLE advertising (e.g., with a UUID of an authentication service in the advertisement data).

In some embodiments, at a part 418, automotive head unit 402 may fetch a current private random address of connectivity extension unit 404, such as by sending a request to read a private random address to connectivity extension unit 404 and receiving a response to the request from connectivity extension unit 404. Automotive head unit 402 may then send the current private random address of connectivity extension unit 404 to mobile device 406. This may in turn help mobile device 406 recognize connectivity extension unit 404 as an advertising device.

At a part 420, after receiving the BLE advertisement, mobile device 406 may establish a BLE connection to connectivity extension unit 404, such as by transmitting an LE connection request to connectivity extension unit 404.

At a part 422, after establishment of that BLE connection, connectivity extension unit 404 may read the authentication key from mobile device 406 (e.g., over GATT), and may compare the authentication key it receives from mobile device 406 to the authentication key it had already received from automotive head unit 402, in order to verify whether the authentication keys as received from the two different sources match. If the authentication keys match, then connectivity extension unit 404 may send the confirmation key to mobile device 406 (e.g., over GATT), and/or may move to a pairing mode.

At a part 424, once mobile device 406 receives the confirmation key from connectivity extension unit 404, mobile device 406 may compare the confirmation key it receives against the confirmation key as generated by mobile device 406. If the authentication keys match when compared by connectivity extension unit 404, and if the confirmation keys match when compared by mobile device 406, mobile device 406 may initiate BLE Just Works pairing with connectivity extension unit 404.

At a part 426, after successful BLE pairing, a Bluetooth® link key (e.g., a BR/EDR link key, or BLE link key) may be generated at both the devices (e.g., using a cross-transport key derivation method). Connectivity extension unit 404 and mobile device 406 may then establish connections for a Bluetooth® profile (e.g., a BR/EDR profile, an HFP profile, an A2DP profile, and so on) without any further pairing (e.g., for BR/EDR). Since both devices will have been authenticated by exchanging and verifying the authentication key and the confirmation key, the connection between them may be considered trusted.

If the authentication keys do not match when compared by connectivity extension unit 404, then connectivity extension unit 404 may disconnect its BLE connection with mobile device 406. Similarly, if the confirmation keys do not match when compared by mobile device 406, then mobile device 406 may disconnect its BLE connection with connectivity extension unit 404.

In various embodiments disclosed herein (e.g., with respect to FIGS. 2 through 4), mobile devices and/or automotive head units may generate authentication keys and/or confirmation keys randomly or pseudo-randomly, for example, and such keys may be generated uniquely for each specific instance of pairing (or attempted pairing) between a mobile device and a connectivity extension unit. Moreover, the keys disclosed herein may be of 16 bytes in length, but keys of other lengths may be generated in various embodiments. For example, in some embodiments, generated keys may be of greater than 16 bytes in length, while in other embodiments generated keys may be of less than 16 bytes in length.

FIGS. 5A and 5B show a method of for providing secured and/or seamless authentication (e.g., authentication without manual user intervention) of a Bluetooth® link between a mobile device and a connectivity extension unit lacking a display or I/O unit. A method 500 comprises a transmitting 505, a providing 510, a transmitting 515, a comparison 520, a performing 530, a transmitting 535, a performing 540, a comparison 545, and a verifying 555. In various embodiments, method 500 may also comprise a disconnecting 525, a disconnecting 550, and/or a processing 560. Method 500 may be employed to carry out protocol 200 and/or protocol 300.

At transmitting 505, an authentication key may be transmitted from a mobile device to an automotive head unit of a vehicle (which may be substantially similar to mobile device 106 and/or automotive head unit 102, respectively) over a securely-paired wireless communication link (which may be substantially similar to first link 112). At providing 510, the authentication key may be provided from the automotive head unit to a connectivity extension unit of the vehicle (which may be substantially similar to connectivity extension unit 104) over a vehicular communication link (which may be substantially similar to second link 114). At transmitting 515, the authentication key may be transmitted from the mobile device to the connectivity extension unit over a non-securely-paired wireless communication link (which may be substantially similar to third link 116).

At comparison 520, which may be undertaken at the connectivity extension unit, if the authentication key as provided by the automotive head unit matches the authentication key as transmitted by the mobile device, then method 500 may proceed to performing 530. Otherwise, method 500 may proceed to disconnecting 525. In various embodiments, at disconnecting 525 (which may be undertaken at the connectivity extension unit), the mobile device may be disconnected from the connectivity extension unit.

At performing 530, a predetermined transformation of the authentication key may be performed to generate a first transformed key. At transmitting 535, the first transformed key may be transmitted from the connectivity extension unit to the mobile device over the non-securely-paired wireless communication link. At performing 540, which may be undertaken at the mobile device, the predetermined transformation may be performed on the authentication key to generate a second transformed key.

At comparison 545, which may be undertaken at the mobile device, if the first transformed key matches the second transformed key, method 500 may proceed to verifying 555. Otherwise, method 500 may proceed to disconnecting 550. In various embodiments, at disconnecting 550 (which may be undertaken at the mobile device), the mobile device may be disconnected from the connectivity extension unit.

At verifying 555, a security of the non-securely-paired wireless communication link may be verified. In various embodiments, at processing 560 (which may be undertaken at the mobile device and/or the connectivity extension unit), one or more additional profile connections between the mobile device and the connectivity extension unit may be processed via the non-securely-paired wireless communication link.

In some embodiments, the securely-paired wireless communication link may be a Bluetooth® Low Energy link. For some embodiments, the vehicular communication link may include a Controller Area Network (CAN) bus, a Universal Serial Bus (USB) bus, and/or an Ethernet connection. In some embodiments, the non-securely-paired wireless communication link may include a Bluetooth® BR/EDR based link (e.g., a Bluetooth® Classic based link) or a BLE based link.

For some embodiments, the securely-paired wireless communication link may be based upon a pairing method using a numerical comparison. In some embodiments, the non-securely-paired wireless communication link may be based upon a Just Works pairing method. For various embodiments, the authentication key may be a 16-byte value, or may be a value of at least 16 bytes in length. In various embodiments, the predetermined transformation may be an increment-by-one operation.

FIGS. 6A and 6B show a method of verifying security of a non-securely-paired wireless communication link in a vehicle. A method 600 comprises a pairing 605, a transmitting 610, a providing 615, a pairing 620, a transmitting 625, a comparison 630, a performing 640, a transmitting 645, a performing 650, and a verifying 655. In various embodiments, method 600 may comprise a disconnecting 635, a comparison 660, a disconnecting 665, and/or a processing 670. Method 600 may be employed to carry out protocol 200 and/or protocol 300.

At pairing 605, a mobile device and an automotive head unit of a vehicle (which may be substantially similar to mobile device 106 and/or automotive head unit 102, respectively) may be paired over a first link, the first link being a securely-paired wireless link (which may be substantially similar to first link 112). At transmitting 610, a first key may be transmitted from the mobile device to the automotive head unit over the first link. At providing 615, the first key may be provided from the automotive head unit to a connectivity extension unit of the vehicle (which may be substantially similar to connectivity extension unit 104) over a second link, the second link being a vehicular communication link (which may be substantially similar to second link 114). At pairing 620, the mobile device and the connectivity extension unit may be paired over a third link, the third link being a non-securely-paired wireless link (which may be substantially similar to third link 116). At transmitting 625, the first key may be transmitted from the mobile device to the connectivity extension unit over the third link.

At comparison 630 (which may be undertaken at the connectivity extension unit), if the first key as received from the automotive head unit matches the first key as received from the mobile device, method 600 may proceed to performing 640. Otherwise, method 600 may proceed to disconnecting 635. In various embodiments, at disconnecting 635, the mobile device may be disconnected from the connectivity extension unit.

At performing 640, a predetermined transformation may be performed on the first key to generate a second key. At transmitting 645, the second key may be transmitted through the third link to the mobile device. At performing 650 (which may be undertaken at the mobile device), the predetermined transformation may be performed on the first key to generate a third key. At verifying 655, a security of the third link may be verified based on a comparison of the second key to the third key.

In various embodiments, at comparison 660, which may be undertaken at the mobile device, if the second key matches the third key, method 600 may proceed to processing 670. Otherwise, method 600 may proceed to disconnecting 665. In various embodiments, at disconnecting 665, the mobile device may be disconnected from the connectivity extension unit.

In various embodiments, at processing 670, one or more additional profile connections between the mobile device and the connectivity extension unit may be processed via the third link.

In some embodiments, the first link may be a BLE based link. For some embodiments, the second link may include a Controller Area Network (CAN) bus, a Universal Serial Bus (USB) bus, and/or an Ethernet connection. In some embodiments, the third link may include a BLE based link and/or a Bluetooth® BR/EDR based link (e.g., a Bluetooth® Classic based link).

For some embodiments, the first link may be based upon a pairing method using a numerical comparison. In some embodiments, the third link may be based upon a Just Works pairing method. For some embodiments, the first key may be a 16-byte value. In some embodiments, the predetermined transformation may be an increment-by-one operation.

FIGS. 7A and 7B show a method of securing a non-securely-paired Bluetooth® Low Energy link in a vehicle. A method 700 comprises a pairing 705, a generating 710, a generating 715, a transmitting 720, a transmitting 725, a transmitting 730, a transmitting 735, a comparison 740, a transmitting 750, a comparison 755, and a pairing 765. In various embodiments, method 700 may comprise a disconnecting 745, a disconnecting 760, and/or a processing 770. Method 700 may be employed to carry out protocol 400.

At pairing 705, a mobile device and an automotive head unit of a vehicle may be paired over a first link, the first link being a securely-paired Bluetooth® Low Energy link. At generating 710, at the automotive head unit, an authentication key may be generated. At generating 715, at the mobile device, a confirmation key may be generated. At transmitting 720, the authentication key may be transmitted from the automotive head unit to the mobile device over the first link. At transmitting 725, the confirmation key may be transmitted from the mobile device to the automotive head unit over the first link. At transmitting 730, the authentication key and the confirmation key may be transmitted from the automotive head unit to a connectivity extension unit of the vehicle over a vehicular communication link. At transmitting 735, the authentication key may be transmitted from the mobile device to the connectivity extension unit over a second link, the second link being the non-securely-paired Bluetooth® Low Energy link.

At comparison 740, which may be performed using the connectivity extension unit, if the authentication key as received from the automotive head unit matches the authentication key as received from the mobile device, method 700 may proceed to transmitting 750. Otherwise, method 700 may proceed to disconnecting 745. In various embodiments, at disconnecting 745, the mobile device may be disconnected from the connectivity extension unit.

At transmitting 750, the confirmation key may be transmitted from the connectivity extension unit to the mobile device.

At comparison 755, which may be performed using the mobile device, if the confirmation key as received from the automotive head unit matches the confirmation key as received from the connectivity extension unit to secure the second link, method 700 may proceed to pairing 765. Otherwise, method 700 may proceed to disconnecting 760. At disconnecting 760, the mobile device may be disconnected from the connectivity extension unit.

At pairing 765, the mobile device and the connectivity extension unit may be paired over the second link. In some embodiments, at processing 760, one or more additional profile connections between the mobile device and the connectivity extension unit may be processed via the second link.

In some embodiments, the first link may be based upon a pairing method using a numerical comparison. For some embodiments, the vehicular communication link may include a Controller Area Network (CAN) bus, a Universal Serial Bus (USB) bus, and/or an Ethernet connection. In some embodiments, the second link may be based upon a Just Works pairing method. For various embodiments, the authentication key may be a 16-byte value, and/or the confirmation key may be a 16-byte value.

The methods may be configured for the operation of the systems disclosed herein. Thus, the same advantages that apply to the systems may apply to the methods.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, and so on. The described methods and associated actions may also be performed in various orders in addition to the order described in this application, in parallel, and/or simultaneously.

The specific routines described herein may represent one or more of any number of processing strategies. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into a memory (e.g., a non-transitory memory) of a computer readable storage medium, where the described actions are carried out by executing the instructions in a system including the various engine hardware components in combination with an electronic controller.

Figure 8:
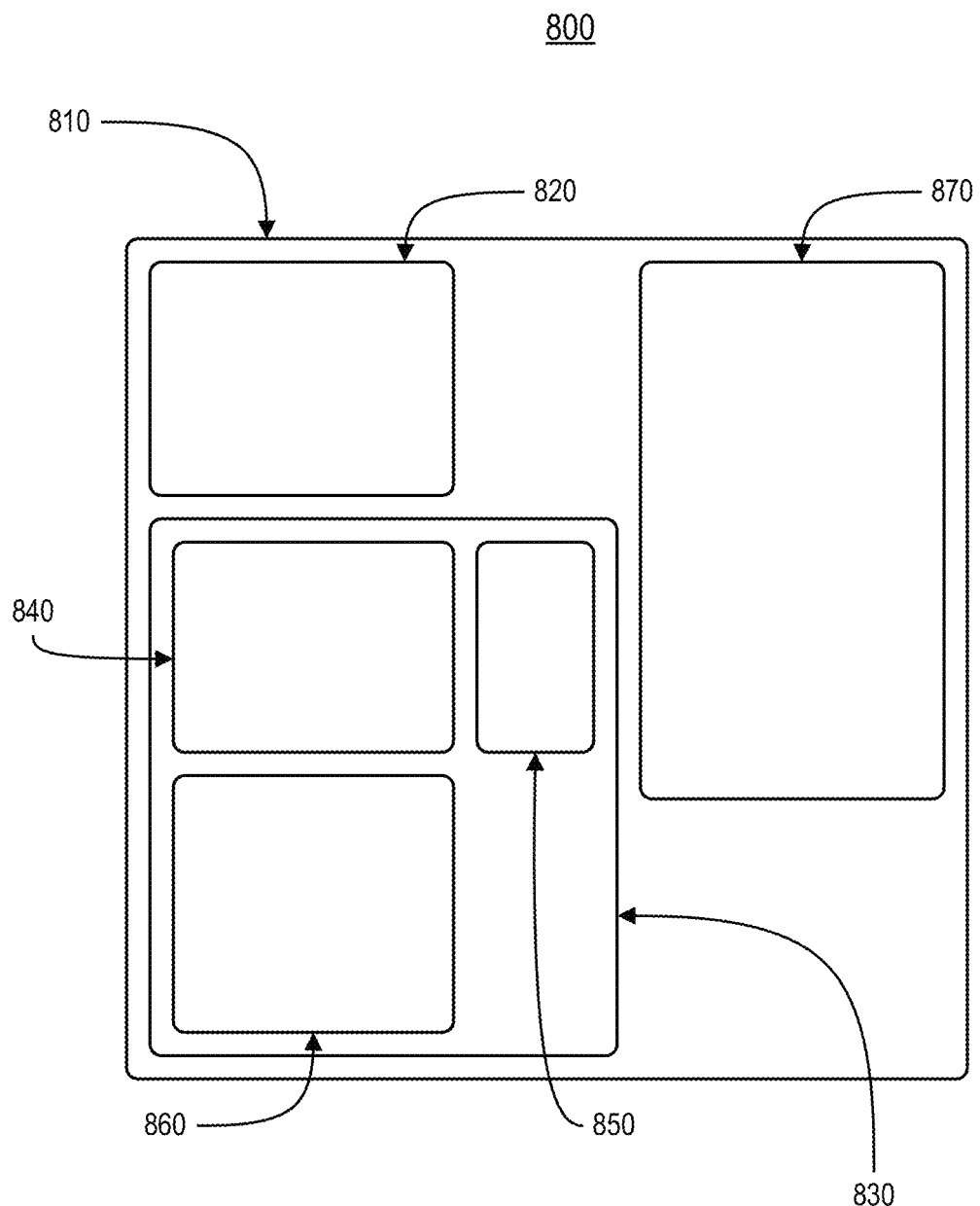
FIG. 8 shows a block diagram of a system that may be incorporated within mobile devices, automotive head units, and/or connectivity extension units for carrying out various aspects of the protocols and methods disclosed herein, in accordance with one or more embodiments of the present disclosure.

For example, FIG. 8 shows a block diagram of a system that may be incorporated within mobile devices, automotive head units, and/or connectivity extension units for carrying out various aspects of the protocols and methods disclosed herein. With respect to protocol 200, protocol 300, and protocol 400 of FIGS. 2-4, and with respect to method 500, method 600, and method 700 of FIGS. 5A through 7B, the mobile devices, automotive head units, and connectivity extension units carrying out various aspects the protocols and methods may incorporate computing systems substantially similar in nature to system 800.

System 800 may comprise a housing 810, a power source 820, an interconnection board 830, one or more processors 840, one or more memories 850 (e.g., non-transitory memories), one or more input/output (I/O) interfaces 860, and/or one or more media drives 870.

Memories 850 may have executable instructions stored therein that, when executed, cause processors 840 to perform various operations, as disclosed herein. I/O interfaces 860 may include, for example, one or more interfaces for wired connections (e.g., Ethernet connections) and/or one or more interfaces for wireless connections (e.g., Wi-Fi and/or cellular connections).

System 800 (and/or other systems and devices disclosed herein) may be configured in accordance with the systems discussed herein. For example, system 800 may perform portions of protocols substantially similar to protocol 200, protocol 300, and/or protocol 400. System 800 may also perform portions of methods substantially similar to method 500, method 600, and/or method 700. Thus, the same advantages that apply to the protocols and methods discussed herein may apply to system 800.

The description of embodiments has been presented for purposes of illustration and description. Suitable modifications and variations to the embodiments may be performed in light of the above description or may be acquired from practicing the methods. For example, unless otherwise noted, one or more of the described protocols and/or methods may be performed by a suitable device and/or combination of devices, such as systems substantially similar to system 800 in a mobile device, an automotive head unit, and/or a connectivity extension unit, as depicted for example in FIG. 1. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

This disclosure accordingly provides support for a method comprising: transmitting an authentication key from a mobile device to an automotive head unit of a vehicle over a securely-paired wireless communication link, providing the authentication key from the automotive head unit to a connectivity extension unit of the vehicle over a vehicular communication link, transmitting the authentication key from the mobile device to the connectivity extension unit over a non-securely-paired wireless communication link, at the connectivity extension unit, if the authentication key as provided by the automotive head unit matches the authentication key as transmitted by the mobile device, performing a predetermined transformation on the authentication key to generate a first transformed key, transmitting the first transformed key from the connectivity extension unit to the mobile device over the non-securely-paired wireless communication link, at the mobile device, performing the predetermined transformation on the authentication key to generate a second transformed key, and at the mobile device, if the first transformed key matches the second transformed key, verifying a security of the non-securely-paired wireless communication link. In a first example of the method comprising: at the connectivity extension unit, if the authentication key as provided by the automotive head unit does not match the authentication key as transmitted by the mobile device, disconnecting the mobile device from the connectivity extension unit. In a second example of the method, optionally including the first example comprising: at the mobile device, if the first transformed key does not match the second transformed key, disconnecting the mobile device from the connectivity extension unit. In a third example of the method, optionally including one or both of the first and second examples comprising: at the mobile device, if the first transformed key matches the second transformed key, processing one or more additional profile connections between the mobile device and the connectivity extension unit via the non-securely-paired wireless communication link. In a fourth example of the method, optionally including one or more or each of the first through third examples, the securely-paired wireless communication link is a Bluetooth® Low Energy link. In a fifth example of the method, optionally including one or more or each of the first through fourth examples, the vehicular communication link is selected from a group consisting of: a Controller Area Network (CAN) bus, a Universal Serial Bus (USB) bus, and an Ethernet connection. In a sixth example of the method, optionally including one or more or each of the first through fifth examples, the non-securely-paired wireless communication link is selected from a group consisting of: a Bluetooth® Low Energy link, and a Bluetooth® Classic link. In a seventh example of the method, optionally including one or more or each of the first through sixth examples, the securely-paired wireless communication link is based upon a pairing method using a numerical comparison. In an eighth example of the method, optionally including one or more or each of the first through seventh examples, the non-securely-paired wireless communication link is based upon a Just Works pairing method. In a ninth example of the method, optionally including one or more or each of the first through eighth examples, the authentication key is a 16-byte value, and wherein the predetermined transformation is an increment-by-one operation.

This disclosure also provides support for a method of verifying security of a non-securely-paired wireless communication link in a vehicle, the method comprising: pairing a mobile device and an automotive head unit of the vehicle over a first link, the first link being a securely-paired wireless link, transmitting a first key from the mobile device to the automotive head unit over the first link, providing the first key from the automotive head unit to a connectivity extension unit of the vehicle over a second link, the second link being a vehicular communication link, pairing the mobile device and the connectivity extension unit over a third link, the third link being a non-securely-paired wireless link, transmitting the first key from the mobile device to the connectivity extension unit over the third link, at the connectivity extension unit, if the first key as received from the automotive head unit matches the first key as received from the mobile device, performing a predetermined transformation on the first key to generate a second key, transmitting the second key through the third link to the mobile device, at the mobile device, performing the predetermined transformation on the first key to generate a third key, and verifying a security of the third link based on a comparison of the second key to the third key. In a first example of the method comprising: at the connectivity extension unit, if the first key as received from the automotive head unit does not match the first key as received from the mobile device, disconnecting the mobile device from the connectivity extension unit, at the mobile device, if the second key matches the third key, processing one or more additional profile connections between the mobile device and the connectivity extension unit via the third link, and at the mobile device, if the second key does not match the third key, disconnecting the mobile device from the connectivity extension unit. In a second example of the method, optionally including the first example, the first link is a Bluetooth® Low Energy link, wherein the second link is selected from a group consisting of: a Controller Area Network (CAN) bus, a Universal Serial Bus (USB) bus, and an Ethernet connection, and wherein the third link is selected from a group consisting of: a Bluetooth® Low Energy link, and a Bluetooth® Classic link. In a third example of the method, optionally including one or both of the first and second examples, the first link is based upon a pairing method using a numerical comparison, and wherein the third link is based upon a Just Works pairing method. In a fourth example of the method, optionally including one or more or each of the first through third examples, the first key is a 16-byte value, and wherein the predetermined transformation is an increment-by-one operation.

This disclosure also provides support for a method of securing a non-securely-paired Bluetooth® Low Energy link in a vehicle, the method comprising: pairing a mobile device and an automotive head unit of the vehicle over a first link, the first link being a securely-paired Bluetooth® Low Energy link, at the automotive head unit, generating an authentication key, at the mobile device, generating a confirmation key, transmitting the authentication key from the automotive head unit to the mobile device over the first link, transmitting the confirmation key from the mobile device to the automotive head unit over the first link, transmitting the authentication key and the confirmation key from the automotive head unit to a connectivity extension unit of the vehicle over a vehicular communication link, transmitting the authentication key from the mobile device to the connectivity extension unit over a second link, the second link being the non-securely-paired Bluetooth® Low Energy link, using the connectivity extension unit, if the authentication key as received from the automotive head unit matches the authentication key as received from the mobile device, transmitting the confirmation key from the connectivity extension unit to the mobile device, and using the mobile device, if the confirmation key as received from the automotive head unit matches the confirmation key as received from the connectivity extension unit to secure the second link, pairing the mobile device and the connectivity extension unit over the second link. In a first example of the method, the method further comprises: using the connectivity extension unit, if the authentication key as received from the automotive head unit does not match the authentication key as received from the mobile device, disconnecting the mobile device from the connectivity extension unit. In a second example of the method, optionally including the first example, the method further comprises: at the mobile device, if the confirmation key as received from the automotive head unit matches the confirmation key as received from the connectivity extension unit, processing one or more additional profile connections between the mobile device and the connectivity extension unit via the second link, and at the mobile device, if the confirmation key as received from the automotive head unit does not match the confirmation key as received from the connectivity extension unit, disconnecting the mobile device from the connectivity extension unit. In a third example of the method, optionally including one or both of the first and second examples, the first link is based upon a pairing method using a numerical comparison, wherein the vehicular communication link is selected from a group consisting of: a Controller Area Network (CAN) bus, a Universal Serial Bus (USB) bus, and an Ethernet connection, and wherein the second link is based upon a Just Works pairing method. In a fourth example of the method, optionally including one or more or each of the first through third examples, the authentication key is a 16-byte value, and wherein the confirmation key is a 16-byte value.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. Terms such as "first," "second," "third," and so on are used merely as labels, and are not intended to impose numerical requirements or a particular positional order on their objects. The following claims particularly point out subject matter from the above disclosure that is regarded as novel and non-obvious.

The invention claimed is:

1. A method comprising:
   transmitting an authentication key from a mobile device to an automotive head unit of a vehicle over a securely-paired wireless communication link;
   providing the authentication key from the automotive head unit to a connectivity extension unit of the vehicle over a vehicular communication link;
   transmitting the authentication key from the mobile device to the connectivity extension unit over a non-securely-paired wireless communication link;
   at the connectivity extension unit, if the authentication key as provided by the automotive head unit matches the authentication key as transmitted by the mobile device, performing a predetermined transformation on the authentication key to generate a first transformed key;
   transmitting the first transformed key from the connectivity extension unit to the mobile device over the non-securely-paired wireless communication link;
   at the mobile device, performing the predetermined transformation on the authentication key to generate a second transformed key; and
   at the mobile device, if the first transformed key matches the second transformed key, verifying a security of the non-securely-paired wireless communication link.

2. The method of claim 1, comprising:
   at the connectivity extension unit, if the authentication key as provided by the automotive head unit does not match the authentication key as transmitted by the mobile device, disconnecting the mobile device from the connectivity extension unit.

3. The method of claim 1, comprising:
   at the mobile device, if the first transformed key does not match the second transformed key, disconnecting the mobile device from the connectivity extension unit.

4. The method of claim 1, comprising:
   at the mobile device, if the first transformed key matches the second transformed key, processing one or more additional profile connections between the mobile device and the connectivity extension unit via the non-securely-paired wireless communication link.

5. The method of claim 1,
   wherein the securely-paired wireless communication link is a Bluetooth® Low Energy link.

6. The method of claim 1,
   wherein the vehicular communication link is selected from a group consisting of: a Controller Area Network (CAN) bus; a Universal Serial Bus (USB) bus; and an Ethernet connection.

7. The method of claim 1,
   wherein the non-securely-paired wireless communication link is selected from a group consisting of: a Bluetooth® Low Energy link; and a Bluetooth® Classic link.

8. The method of claim 1,
   wherein the securely-paired wireless communication link is based upon a pairing method using a numerical comparison.

9. The method of claim 1,
   wherein the non-securely-paired wireless communication link is based upon a Just Works pairing method.

10. The method of claim 1,
    wherein the authentication key is a 16-byte value; and
    wherein the predetermined transformation is an increment-by-one operation.

11. A method of verifying security of a non-securely-paired wireless communication link in a vehicle, the method comprising:
    pairing a mobile device and an automotive head unit of the vehicle over a first link, the first link being a securely-paired wireless link;
    transmitting a first key from the mobile device to the automotive head unit over the first link;
    providing the first key from the automotive head unit to a connectivity extension unit of the vehicle over a second link, the second link being a vehicular communication link;
    pairing the mobile device and the connectivity extension unit over a third link, the third link being a non-securely-paired wireless link;
    transmitting the first key from the mobile device to the connectivity extension unit over the third link;
    at the connectivity extension unit, if the first key as received from the automotive head unit matches the first key as received from the mobile device, performing a predetermined transformation on the first key to generate a second key;
    transmitting the second key through the third link to the mobile device;

at the mobile device, performing the predetermined transformation on the first key to generate a third key; and
verifying a security of the third link based on a comparison of the second key to the third key.

12. The method of verifying security of a non-securely-paired wireless communication link in a vehicle of claim 11, comprising:
at the connectivity extension unit, if the first key as received from the automotive head unit does not match the first key as received from the mobile device, disconnecting the mobile device from the connectivity extension unit;
at the mobile device, if the second key matches the third key, processing one or more additional profile connections between the mobile device and the connectivity extension unit via the third link; and
at the mobile device, if the second key does not match the third key, disconnecting the mobile device from the connectivity extension unit.

13. The method of verifying security of a non-securely-paired wireless communication link in a vehicle of claim 11,
wherein the first link is a Bluetooth® Low Energy link;
wherein the second link is selected from a group consisting of: a Controller Area Network (CAN) bus; a Universal Serial Bus (USB) bus; and an Ethernet connection; and
wherein the third link is selected from a group consisting of: a Bluetooth® Low Energy link; and a Bluetooth® Classic link.

14. The method of verifying security of a non-securely-paired wireless communication link in a vehicle of claim 11,
wherein the first link is based upon a pairing method using a numerical comparison; and
wherein the third link is based upon a Just Works pairing method.

15. The method of verifying security of a non-securely-paired wireless communication link in a vehicle of claim 11,
wherein the first key is a 16-byte value; and
wherein the predetermined transformation is an increment-by-one operation.

16. A method of securing a non-securely-paired Bluetooth® Low Energy link in a vehicle, the method comprising:
pairing a mobile device and an automotive head unit of the vehicle over a first link, the first link being a securely-paired Bluetooth® Low Energy link;
at the automotive head unit, generating an authentication key;
at the mobile device, generating a confirmation key;
transmitting the authentication key from the automotive head unit to the mobile device over the first link;
transmitting the confirmation key from the mobile device to the automotive head unit over the first link;
transmitting the authentication key and the confirmation key from the automotive head unit to a connectivity extension unit of the vehicle over a vehicular communication link;
transmitting the authentication key from the mobile device to the connectivity extension unit over a second link, the second link being the non-securely-paired Bluetooth® Low Energy link;
using the connectivity extension unit, if the authentication key as received from the automotive head unit matches the authentication key as received from the mobile device, transmitting the confirmation key from the connectivity extension unit to the mobile device; and
using the mobile device, if the confirmation key as received from the automotive head unit matches the confirmation key as received from the connectivity extension unit to secure the second link, pairing the mobile device and the connectivity extension unit over the second link.

17. The method of securing a non-securely-paired Bluetooth® Low Energy link in a vehicle of claim 16, further comprising:
using the connectivity extension unit, if the authentication key as received from the automotive head unit does not match the authentication key as received from the mobile device, disconnecting the mobile device from the connectivity extension unit.

18. The method of securing a non-securely-paired Bluetooth® Low Energy link in a vehicle of claim 16, further comprising:
at the mobile device, if the confirmation key as received from the automotive head unit matches the confirmation key as received from the connectivity extension unit, processing one or more additional profile connections between the mobile device and the connectivity extension unit via the second link; and
at the mobile device, if the confirmation key as received from the automotive head unit does not match the confirmation key as received from the connectivity extension unit, disconnecting the mobile device from the connectivity extension unit.

19. The method of securing a non-securely-paired Bluetooth® Low Energy link in a vehicle of claim 16,
wherein the first link is based upon a pairing method using a numerical comparison;
wherein the vehicular communication link is selected from a group consisting of: a Controller Area Network (CAN) bus; a Universal Serial Bus (USB) bus; and an Ethernet connection; and
wherein the second link is based upon a Just Works pairing method.

20. The method of securing a non-securely-paired Bluetooth® Low Energy link in a vehicle of claim 16,
wherein the authentication key is a 16-byte value; and
wherein the confirmation key is a 16-byte value.

* * * * *